US012623475B2

(12) United States Patent
Sunaoshi

(10) Patent No.: US 12,623,475 B2
(45) Date of Patent: May 12, 2026

(54) LIQUID DISCHARGE APPARATUS INCLUDING A DISCHARGER ON A WHEELED PLATFORM AND CONVEYOR

(71) Applicant: Masayuki Sunaoshi, Ibaraki (JP)

(72) Inventor: Masayuki Sunaoshi, Ibaraki (JP)

(73) Assignee: RICOH COMPANY, LTD., Tokyo (JP)

( * ) Notice: Subject to any disclaimer, the term of this patent is extended or adjusted under 35 U.S.C. 154(b) by 216 days.

(21) Appl. No.: 18/415,673

(22) Filed: Jan. 18, 2024

(65) Prior Publication Data

US 2024/0246345 A1 Jul. 25, 2024

(30) Foreign Application Priority Data

Jan. 20, 2023 (JP) ................................ 2023-007462

(51) Int. Cl.
*B41J 29/06* (2006.01)
*B41J 2/165* (2006.01)
*E01C 23/22* (2006.01)

(52) U.S. Cl.
CPC ............... *B41J 29/06* (2013.01); *B41J 2/165* (2013.01); *E01C 23/22* (2013.01)

(58) Field of Classification Search
CPC ... B41J 29/06; B41J 2/165; B41J 3/407; B41J 3/28; B41J 25/001; B41J 25/304; B41J 29/393; E01C 23/22; E01C 23/227; B62B 5/049
See application file for complete search history.

(56) References Cited

FOREIGN PATENT DOCUMENTS

| | | | | | |
|---|---|---|---|---|---|
| CN | 110743740 | A | | 2/2020 | |
| CN | 211818217 | U | | 10/2020 | |
| CN | 214522834 | U | | 10/2021 | |
| CN | 214928311 | U | | 11/2021 | |
| CN | 218315854 | U | | 1/2023 | |
| JP | H05-254107 | A | | 10/1993 | |
| JP | H06-220987 | A | | 8/1994 | |
| JP | H07-156365 | A | | 6/1995 | |
| JP | 2021-092540 | A | | 6/2021 | |
| KR | 10-2010-0047487 | A | | 5/2010 | |
| KR | 20100047487 | A | * | 5/2010 | ................ B41J 3/28 |

OTHER PUBLICATIONS

Extended European Search Report issued Jun. 3, 2024 in European Patent Application No. 24152663.1, 12 pages.

* cited by examiner

*Primary Examiner* — Bradley W Thies
(74) *Attorney, Agent, or Firm* — XSENSUS LLP

(57) ABSTRACT

A liquid discharge apparatus includes a wheeled platform and a discharger. The discharger is disposed on the wheeled platform to discharge a liquid onto an installation surface on which the discharger is installed. The wheeled platform movably holds the discharger in a vertical direction. The discharger includes at least three or more first supports and a second support. The at least three or more first supports are disposed at different corners of the discharger in a plan direction perpendicular to the vertical direction, to contact the installation surface to support the discharger. The second support is disposed at a corner different from the corners of the at least three or more first supports in the plan direction, to support the discharger. A position of the second support is adjustable in the vertical direction with respect to the installation surface.

13 Claims, 7 Drawing Sheets

LIQUID DISCHARGE APPARATUS INCLUDING A DISCHARGER ON A WHEELED PLATFORM AND CONVEYOR

CROSS-REFERENCE TO RELATED APPLICATION

This patent application is based on and claims priority pursuant to 35 U.S.C. § 119(a) to Japanese Patent Application No. 2023-007462, filed on Jan. 20, 2023, in the Japan Patent Office, the entire disclosure of which is hereby incorporated by reference herein.

BACKGROUND

Technical Field

Embodiments of the present disclosure relate to a liquid discharge apparatus and a conveyor.

Related Art

When, for example, white lines, characters, or symbols are printed on a road surface, a printing apparatus often forms a large printing region that exceeds a region in which a carriage, on which a discharge head is mounted, moves. For this reason, it is necessary to divide the printing region into multiple printing regions and to print multiple images such that the multiple images are connected while the printing apparatus is moved to each of the divided printing regions. As described above, when printing is performed on a road surface, typically, it is necessary to alternately move the printing apparatus itself and perform the printing process. In this case, when printing is performed by the printing apparatus, it is necessary to adjust the distance between a road surface, which may also be referred to simply as an installation surface in the following description, and the discharge head within a specified range. At the same time, it is necessary to prevent the printing apparatus from vibrating when a carriage provided for the printing apparatus performs scanning. For this reason, it is necessary to quickly fix the position of the printing apparatus with respect to a road surface when the road surface has irregularities.

A technology has been disclosed that fixes the position of a printing apparatus with respect to a road surface having irregularities, in which, in a composite apparatus including multiple units, the heights of the multiple units are automatically adjusted from a level output of a reference unit and a level output of another unit such that a level deviation amount of the other unit is reduced.

SUMMARY

In an embodiment of the present disclosure, a liquid discharge apparatus includes a wheeled platform and a discharger. The discharger is disposed on the wheeled platform to discharge a liquid onto an installation surface on which the discharger is installed. The wheeled platform movably holds the discharger in a vertical direction. The discharger includes at least three or more first supports and a second support. The at least three or more first supports are disposed at different corners of the discharger in a plan direction perpendicular to the vertical direction, to contact the installation surface to support the discharger. The second support is disposed at a corner different from the corners of the at least three or more first supports in the plan direction, to support the discharger. A position of the second support is adjustable in the vertical direction with respect to the installation surface.

In another embodiment of the present disclosure, a wheeled platform includes a mounting table movable in a vertical direction. The mounting table includes at least three or more first supports and a second support. The at least three or more first supports are disposed at different corners of the discharger in a plan direction perpendicular to the vertical position, to contact the installation surface to support the discharger. The second support is disposed at a corner different from the corners of said at least three or more first supports in the plan direction, to support the discharger.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
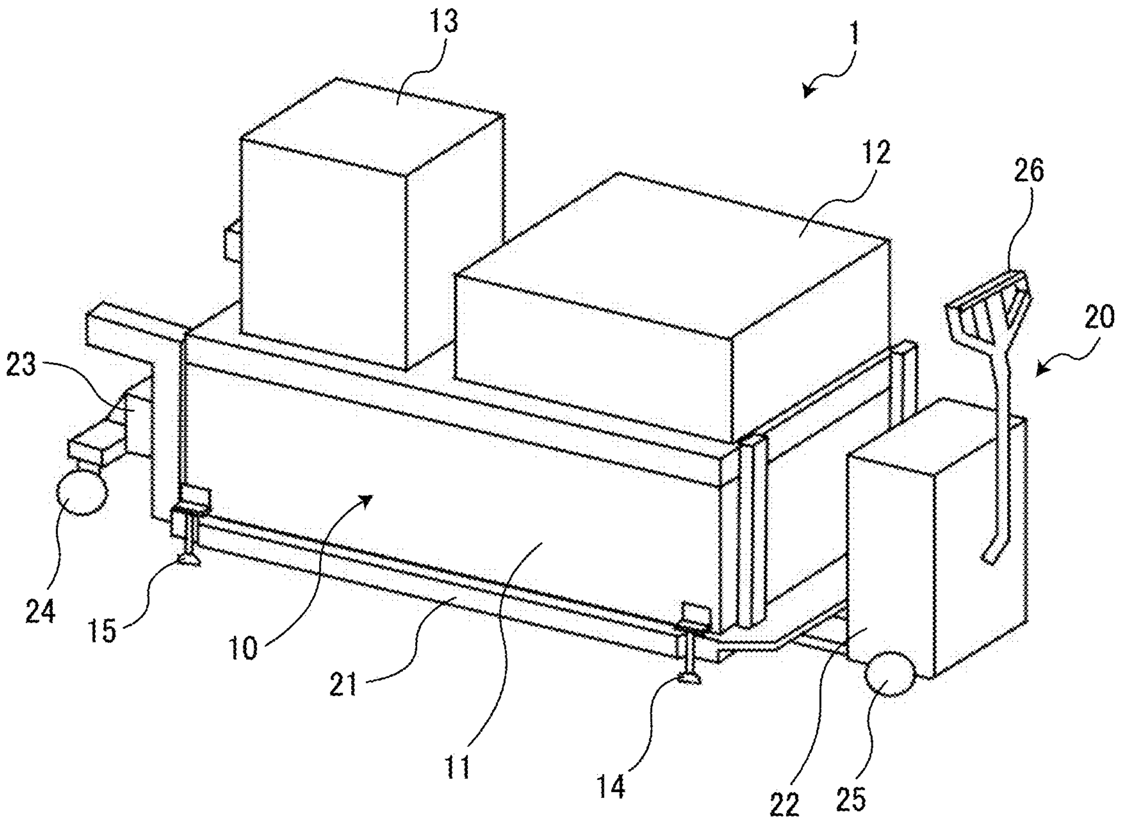
FIG. 1 is a diagram illustrating an overall configuration of a liquid application apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity.

However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A liquid discharge apparatus and a conveyor according to embodiments of the present disclosure are described in detail with reference to the drawings. Embodiments of the present disclosure are not limited by the following embodiments, and the components and elements in the following embodiments include those that can be easily conceived from the components and elements by those skilled in the art, substantially similar components and elements, and so-called equivalent ranges of components and elements. Numerous additional modifications and variations are possible in light of the above teachings. It is therefore to be understood that within the scope of the appended claims, the disclosure of the present disclosure may be practiced otherwise than as specifically described herein.

Configuration of Liquid Application Apparatus

Figure 2:
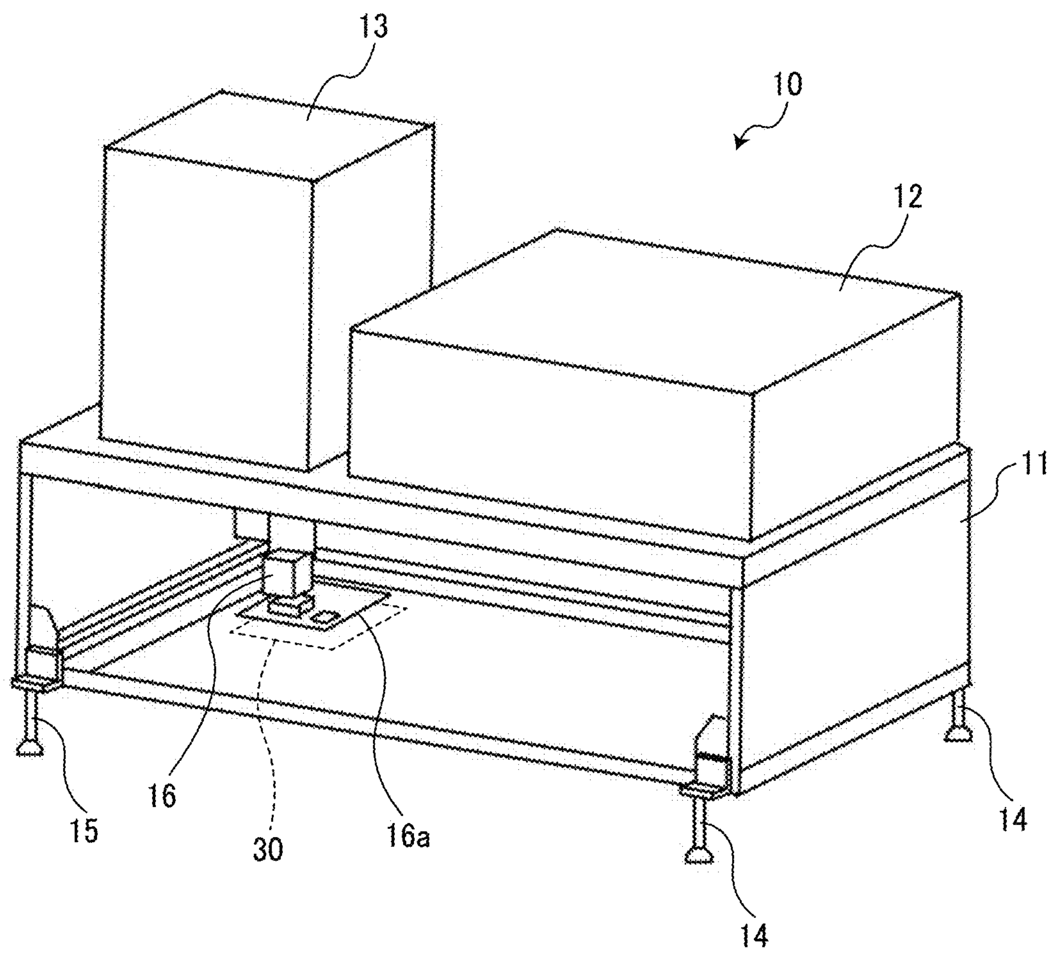
FIG. 2 is a diagram illustrating the liquid application apparatus of FIG. 1 when a carriage of a printer provided for the liquid discharge apparatus is positioned at a maintenance position.

FIG. 1 is a diagram illustrating an overall configuration of a liquid application apparatus 1 according to an embodiment of the present disclosure. FIG. 2 is a diagram illustrating the liquid application apparatus 1 when a carriage of a printer provided for the liquid discharge apparatus 1 is positioned at a maintenance position, according to an embodiment of the present disclosure. The overall configuration of the liquid application apparatus 1 according to the present embodiment is described with reference to FIGS. 1 and 2.

The liquid application apparatus 1 illustrated in FIGS. 1 and 2 divides a wide region of an installation surface such as a road surface, on which the liquid application apparatus 1 is installed and applies liquid, into multiple printing regions. The liquid application apparatus 1 sequentially moves to each of the printing regions and divides printing data for printing on a region on which the liquid is to be applied into multiple printing images to perform printing. The liquid application apparatus 1 corresponds to a liquid discharge apparatus according to embodiments of the present disclosure. Printing refers to an operation in which ink is applied or sprayed to an installation surface to form an image. In FIG. 2, a state in which a panel on the front side of the sheet surface of FIG. 2 is removed, is illustrated to illustrate an internal configuration of the printer 10. As illustrated in FIG. 1, the liquid application apparatus 1 includes the printer 10 and a wheeled platform 20.

The printer 10 can be conveyed by the wheeled platform 20 and serves as a discharger to perform printing on an installation surface when a carriage of the printer 10, on which a discharge head is mounted, scans. As illustrated in FIGS. 1 and 2, the printer 10 includes a printer body 11, a controller 12, an ink supply system 13, three fixed stands 14 which serves as first supports, one adjustment stand 15 which serves as a second support, a carriage 16, and a maintaining system 16*a*.

In the printer body 11 which is a body of the printer 10, the carriage 16 scans in a main-scanning direction and a sub-scanning direction inside the printer body 11, and various components such as the controller 12 and the ink supply system 13 are mounted on an upper surface of the printer body 11.

The controller 12 controls the printing operation of the printer 10. Specifically, the controller 12 controls, for example, scanning of the carriage 16 in the main-scanning direction and the sub-scanning direction, an ink discharge operation of the discharge head mounted on the carriage 16, and an ink supply operation from the ink supply system 13 to the discharge head.

The ink supply system 13 is installed on the upper surface of the printer body 11 and supplies ink to the discharge head of the carriage 16. Specifically, the ink supply system 13 includes a tank for storing ink and supplies the ink from the tank to the discharge head of the carriage 16 via a supply path such as a tube.

The fixed stands 14 are installed at three of four corners of the bottom surface of the printer body 11 having a rectangular parallelepiped shape as a whole and contact the installation surface to support the printer 10. In FIG. 2, only two of the three fixed stands 14 are illustrated. However, the remaining fixed stand 14 is installed at a position diagonal to a position at which the fixed stand 14 on the front side is installed. The number of the fixed stands 14 is not limited to three and may be equal to or greater than four.

The adjustment stand 15 is installed at one location other than the three locations at which the fixed stands 14 are installed among the four corners of the bottom surface of the printer body 11. The adjustment stand 15 includes a base whose height is adjustable as described below and supports the printer 10 by the base whose height is adjusted. The details of the configuration of the adjustment stand 15 are described below with reference to FIGS. 4 and 5.

The carriage 16 includes the discharge head mounted in the carriage 16. The carriage 16 is moved by a moving mechanism, which is described below, to scan in the main-scanning direction and the sub-scanning direction. The scanning of the carriage 16 is controlled by the controller 12.

A maintenance system 16*a* performs maintenance processing such as cleaning of the nozzle surface of the discharge head mounted on the carriage 16. For example, as illustrated in FIG. 2, the printer 10 executes the maintenance processing by the maintenance system 16*a* when the carriage 16 is moved to a maintenance position 30.

The wheeled platform 20 serves as a conveyor for lifting up the printer 10 from the bottom surface of the printer body 11 to convey the printer 10 to a printing area in which the printer 10 performs printing. As illustrated in FIG. 1, the wheeled platform 20 includes a platform frame 21, a lifting device 22, lifting devices 23, front wheels 24, rear wheels 25, and a handle 26.

The platform frame 21 has a shape surrounding a rectangular shape and supports the printer 10 from the bottom surface of the printer 10 when the printer 10 is lifted and lowered.

The lifting device 22 supports a rear portion of the printer 10 close to the handle 26 to lift and lower the printer 10.

The lifting devices 23 support a front portion of the printer 10, i.e., the left side in FIG. 1, opposite to the handle 26 to lift and lower the printer 10.

The front wheels 24 and the rear wheels 25 serve as wheels for moving the wheeled platform 20 forward, backward, leftward, and rightward.

The handle 26 is attached to the rear side of the wheeled platform 20 to be gripped by an operator. The operator can move the wheeled platform 20 forward, backward, leftward, and rightward as desired by gripping the handle 26.

Configuration of Moving Mechanism of Carriage of Printer

Figure 3:
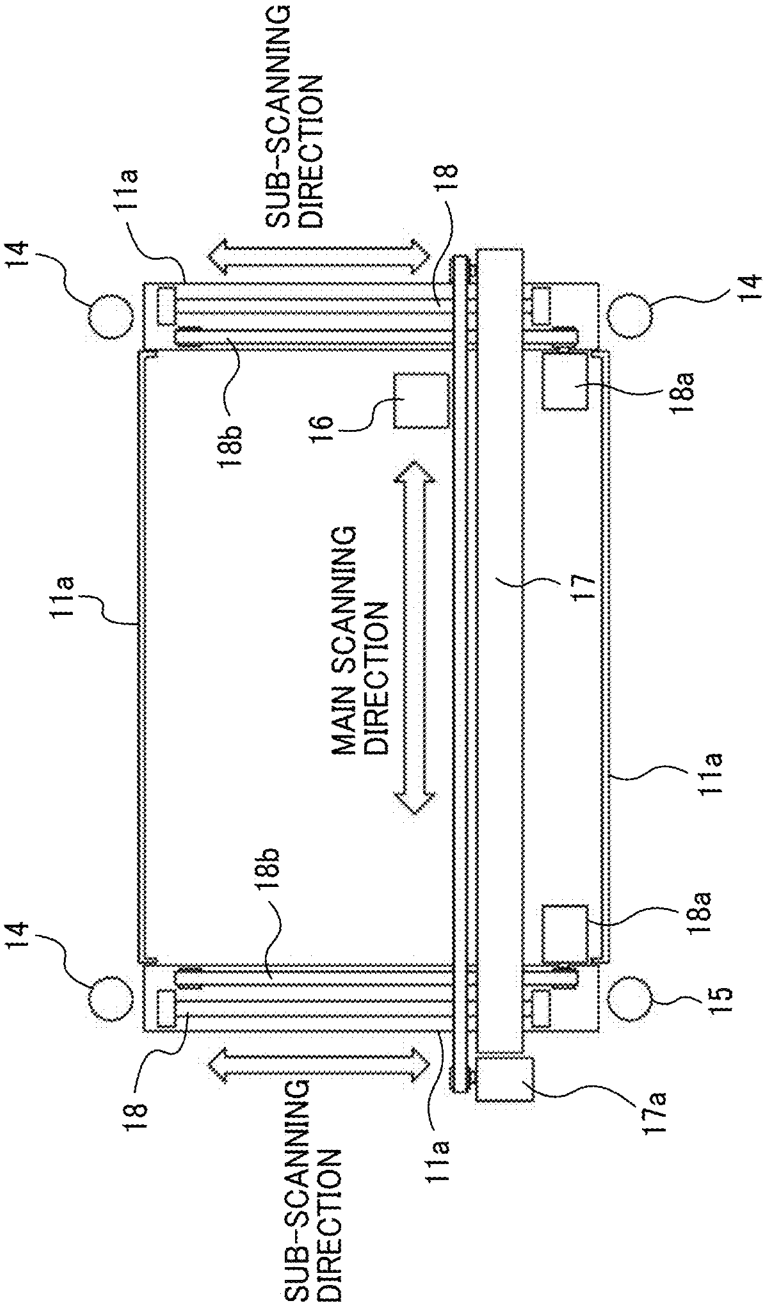
FIG. 3 is a diagram illustrating a configuration of a moving mechanism of a carriage of a liquid application apparatus, according to an embodiment of the present disclosure.

FIG. 3 is a diagram illustrating a configuration of a moving mechanism of the carriage 16 of the liquid application apparatus 1, according to an embodiment of the present disclosure. The configuration of the moving mechanism for causing the carriage 16 of the liquid application apparatus 1 to scan according to the present embodiment is described below with reference to FIG. 3.

As illustrated in FIG. 3, the printer 10 includes, as the moving mechanism for causing the carriage 16 to scan, frames 11*a*, a main-scanning guide 17, a main-scanning motor 17*a*, sub-scanning guides 18, sub-scanning motors 18*a*, and timing belts 18*b*. The moving mechanism is supported by the three fixed stands 14 installed on the frames 11*a*, which serve as peripheral edges of the bottom surface of the printer body 11, and one adjustment stand 15.

The frames 11*a* serve as four sides of the bottom surface of the printer body 11. As described above, the frames 11*a* serve as the four sides of the bottom surface of the printer body 11. As illustrated in FIG. 3, the fixed stands 14 are installed at three corners of the four corners of the bottom surface of the printer body 11, and the adjustment stand 15 is installed at the remaining one corner of the bottom surface of the printer body 11.

The main-scanning guide 17 extends in the main-scanning direction illustrated in FIG. 3 and supports the carriage 16 such that the carriage 16 is slidable in the main-scanning direction.

The main-scanning motor 17*a* causes the carriage 16 to reciprocate in the main-scanning direction along the main-scanning guide 17.

The sub-scanning guides 18 are installed on the respective frames 11*a* extending in the sub-scanning direction illustrated in FIG. 3 to support the main-scanning guide 17 such that the main-scanning guide 17 is slidable in the sub-scanning direction. As illustrated in FIG. 3, the sub-scanning guides 18 are disposed on the respective frames 11*a*, which extend in the sub-scanning direction and are opposed to each other, to support portions around ends of the main-scanning guide 17 extending in the main-scanning direction.

The sub-scanning motors 18*a* serve as motors to cause the main-scanning guide 17 to reciprocate in the sub-scanning direction along the sub-scanning guides 18. Timing belts 18*b*, each of which is wound around pulleys rotated by the corresponding one of the sub-scanning motors 18*a* and pulleys driven by the pulleys rotated by the corresponding one of the sub-scanning motors 18*a*, are driven by the rotation of the sub-scanning motors 18*a*. By so doing, the main-scanning guide 17 reciprocates in the sub-scanning direction.

As described above, the carriage 16 on which the discharge head is mounted can move in the main-scanning direction and the sub-scanning direction on a surface surrounded by the four frames 11*a* as desired.

Configuration of Adjustment Stand

Figure 4:
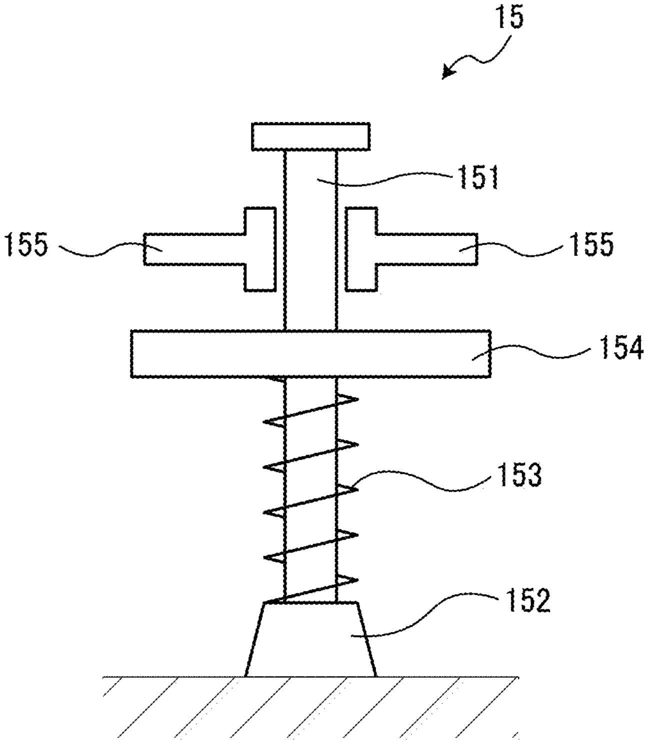
FIG. 4 is a diagram illustrating a configuration of an adjustment stand of a liquid application apparatus, according to an embodiment of the present disclosure.
Figure 5:
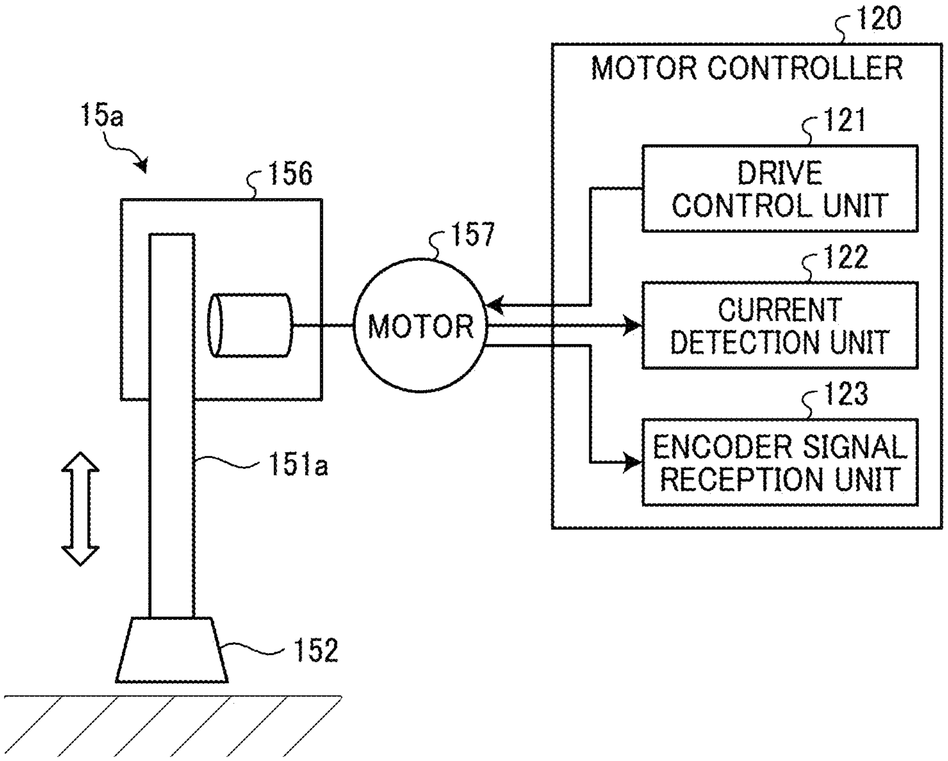
FIG. 5 is a diagram illustrating a configuration of another adjustment stand of a liquid application apparatus, according to an embodiment of the present disclosure.

FIG. 4 is a diagram illustrating a configuration of the adjustment stand 15 of the liquid application apparatus 1, according to an embodiment of the present disclosure. FIG. 5 is a diagram illustrating a configuration of another adjustment stand 15*a* of the liquid application apparatus 1, according to an embodiment of the present disclosure. The configurations of the adjustment stand 15 and the adjustment stand 15*a* of the liquid application apparatus 1 according to embodiments of the present disclosure are described with reference to FIGS. 4 and 5, respectively.

The adjustment stand 15 is installed at one position other than three positions at which the fixed stands 14 are installed among the four corners of the bottom surface of the printer body 11. The height of a base 152 of the adjustment stand 15 is adjustable as described below. The adjustment stand 15 supports the printer 10 with the base 152 of the adjustment stand 15 whose height is adjusted. As illustrated in FIG. 4, the adjustment stand 15 includes a shaft 151, the base 152, a biasing spring 153, a position determiner 154, and a stopper 155.

The shaft 151 is a rod-shaped member and inserted through the position determiner 154 such that the shaft 151 is installed perpendicularly to the bottom surface of the printer body 11. The shaft 151 is movable in the axial direction of the shaft 151, which is the vertical direction, in accordance with expansion and contraction of the biasing spring 153 through an insertion hole of the position determiner 154.

The base 152 is attached to one end of both ends of the shaft 151 in the axial direction closer to the installation surface on which the printer 10 is installed and serves as a base to support the printer 10.

The biasing spring 153 is installed between the base 152 and the position determiner 154, and the shaft 151 is inserted through the biasing spring 153. By so doing, the biasing spring 153 can bias the base 152 with respect to the installation surface. The biasing spring 153 is not limited to a spring and may be an elastic body capable of biasing the base 152 with respect to the installation surface.

The position determiner 154 is a plate-shaped member through which the shaft 151 is inserted to be fixed to the corresponding one of the frames 11*a*. The position determiner 154 presses the biasing spring 153 through which the shaft 151 is inserted from above. By so doing, the biasing force of the biasing spring 153 is transmitted to the base 152.

The stopper 155 presses the circumferential surface of the shaft 151 with a frictional force in a direction perpendicular to the shaft 151. Accordingly, the stopper 155 prevents the shaft 151 from moving in the axial direction of the shaft 151, i.e., the vertical direction, and serves as a fixing member to fix the position of the shaft 151. Accordingly, on an installation surface having irregularities, first, the base 152 is pressed against the installation surface by a predetermined biasing force of the biasing spring 153 in a state in which the stopper 155 is released. While the base is pressed against the installation surface as described above, the shaft 151 is fixed by the stopper 155. By so doing, the adjustment stand 15 can support the printer 10 from below.

The configuration of the adjustment stand 15 is not limited to the configuration illustrated in FIG. 4. For example, the adjustment stand 15*a* that serves as the second support, illustrated in FIG. 5, may be employed instead of the adjustment stand 15. In the adjustment stand 15*a*, the height position of the base 152 is adjustable in a similar manner to the adjustment stand 15. Accordingly, the adjustment stand 15*a* can support the printer 10 by the base 152 whose height is adjusted. As illustrated in FIG. 5, the adjustment stand 15*a* includes a shaft 151*a*, the base 152, a lifting mechanism 156, and a motor 157.

The shaft 151*a* is a rod-shaped member installed on the corresponding one of the frames 11*a* such that the shaft 151*a* is perpendicular to the bottom surface of the printer body 11. The shaft 151*a* is movable in the axial direction of the shaft 151*a*, i.e., the vertical direction, in accordance with the lifting and lowering operation by the lifting mechanism 156.

The base 152 is attached to one of the ends of the shaft 151*a* in the axial direction closer to the installation surface on which the printer 10 is installed and serves as a base to support the printer 10. The lifting mechanism 156 serves as a mechanism to lift and lower the shaft 151*a* in the axial direction, i.e., the vertical direction. The lifting mechanism 156 performs, for example, a feeding operation of gears attached to the rotation shaft of the motor 157, to lift and lower the shaft 151*a* in the axial direction. The motor 157 serves as an electric motor to cause the lifting mechanism 156 to perform the lifting and lowering operation by the rotation of the rotation shaft of the motor 157. Alternatively, the motor 157 stops the rotation of the rotation shaft of the motor 157 to fix the position of the shaft 151*a* in the axial direction, i.e., the vertical direction. As illustrated in FIG. 5, the motor 157 is controlled to rotate by a motor controller 120 provided for the printer 10.

The motor controller 120 includes a drive control unit 121, a current detection unit 122 which serves as a detector, and an encoder signal reception unit 123. The drive control unit 121 serves as a drive controller to control the rotational drive of the motor 157. The current detection unit 122 serves as a circuit to detect a current flowing through the motor 157. The current detection unit 122 can calculate the biasing force applied to the base 152 with respect to the installation surface, in other words, the load applied to the adjustment stand 15*a,* based on a detected current value. The encoder signal reception unit 123 serves as a circuit to calculate the position of the shaft 151*a,* in other words, the height position of the base 152, based on an encoder signal received in accordance with the rotation of the motor 157.

Accordingly, when the installation surface is a surface having irregularities, first, the drive controller 121 causes the shaft 151*a* and the base 152 to move downward by the lifting and lowering operation of the lifting mechanism 156. By so doing, the base 152 is pressed against the installation surface. The drive controller 121 stops the rotation of the motor 157 to fix the shaft 151*a* with the base 152 pressed against the installation surface. Accordingly, the adjustment stand 15*a* can support the printer 10 from below. In this case, the drive controller 121 can set the predetermined biasing force applied to the base 152 with respect to the installation surface on which the base unit 152 is installed based on a current value detected by the current detection unit 122. Accordingly, the load applied to the adjustment stand 15*a* can be adjusted to a predetermined value.

Configuration of Wheeled Platform of Liquid Application Device

Figure 6:
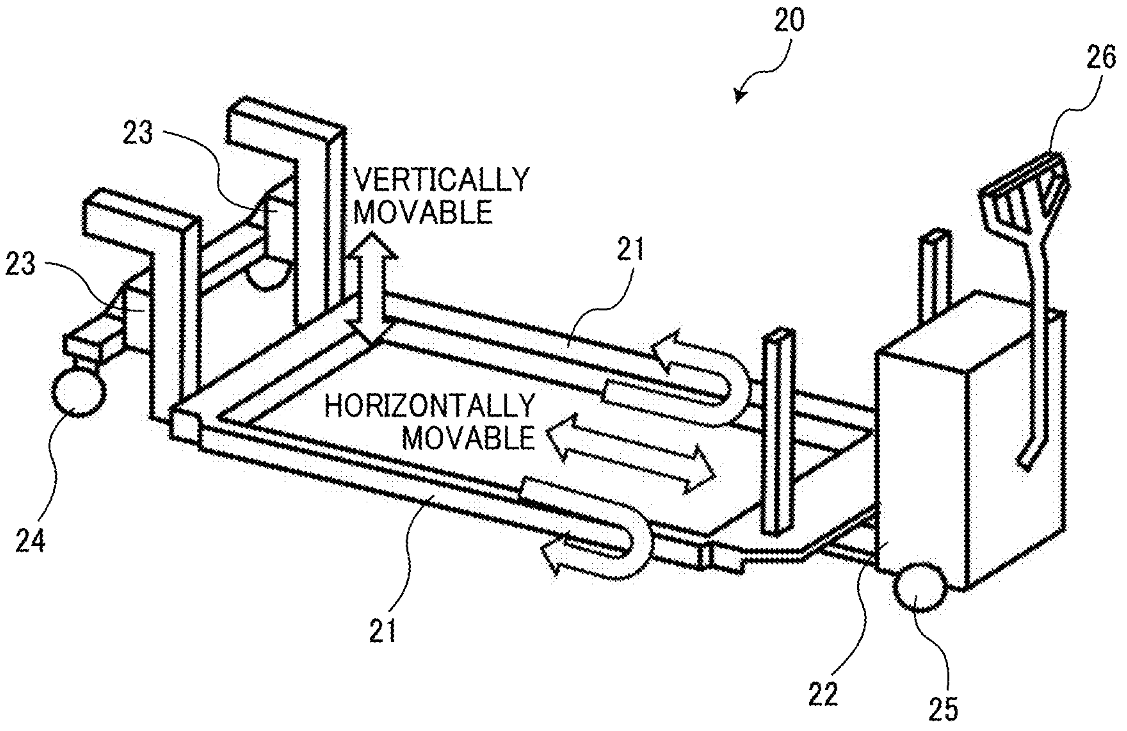
FIG. 6 is a diagram illustrating a configuration of a wheeled platform of a liquid application apparatus, according to an embodiment of the present disclosure.

FIG. 6 is a diagram illustrating a configuration of the wheeled platform 20 of the liquid application apparatus 1, according to an embodiment of the present disclosure. The configuration of the wheeled platform 20 of the liquid application apparatus 1 according to the present embodiment is described in detail with reference to FIG. 6.

As described above, the wheeled platform 20 includes the platform frame 21, the lifting device 22, the lifting devices 23, the front wheels 24, the rear wheels 25, and the handle 26. The wheeled platform 20 can be moved forward, backward, leftward, and rightward with the front wheels 24 and the rear wheels 25 by the operation of an operator via the handle 26 as desired. As illustrated in FIG. 6, the lifting device 22 and the lifting devices 23 can lift and lower the carriage frame 21 surrounding the rectangular shape. Such a configuration as described above allows the printer 10 installed on the carriage frame 21 to be lifted and lowered.

Conveyance Operation and Lifting Operation of Printer by Wheeled Platform

Figure 7:
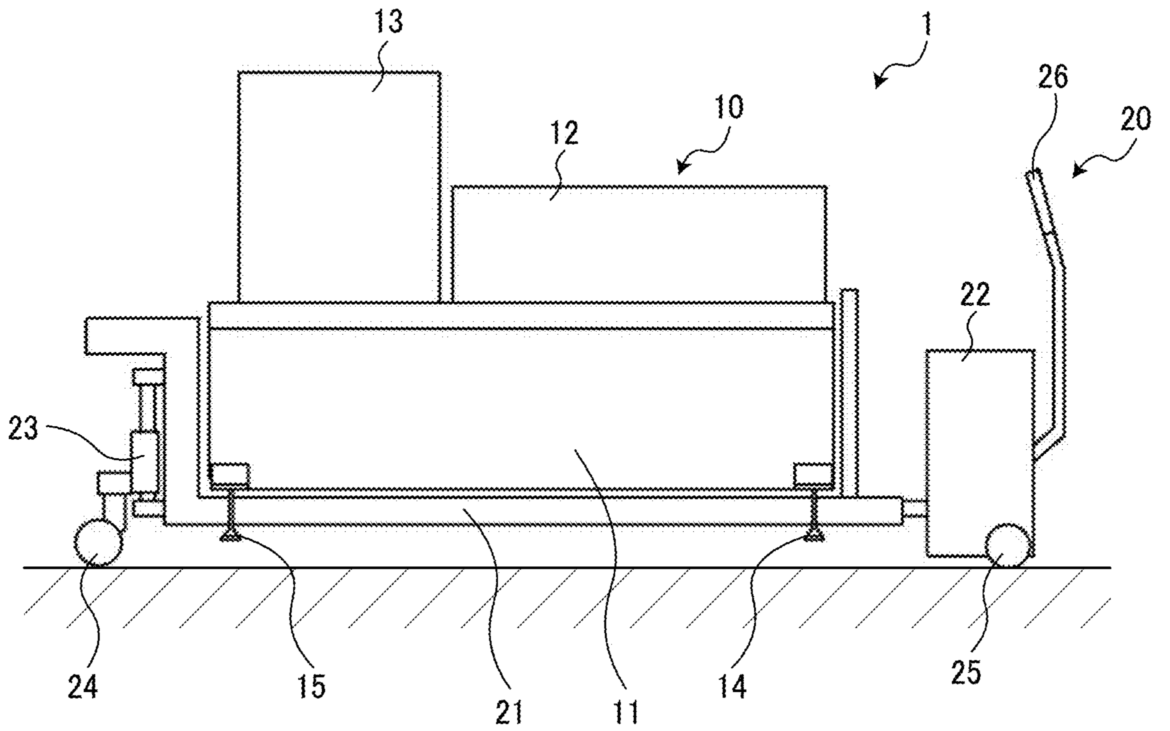
FIG. 7 is a diagram illustrating a liquid application apparatus in which a printer is conveyed by a wheeled platform, according to an embodiment of the present disclosure.
Figure 8:
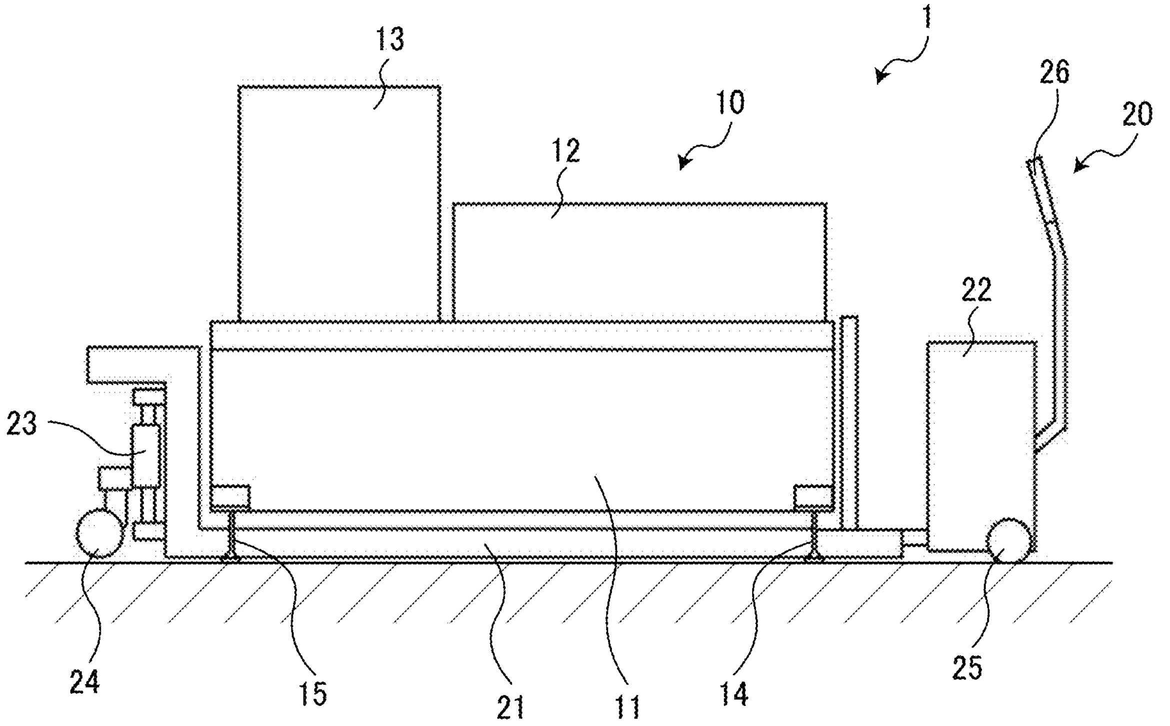
FIG. 8 is a diagram illustrating the liquid discharge apparatus of FIG. 7 in which the printer is lowered from the wheeled platform and installed on an installation surface, according to an embodiment of the present disclosure.

FIG. 7 is a diagram illustrating the liquid application apparatus 1 in which the printer 10 is conveyed by the wheeled platform 20, according to an embodiment of the present disclosure. FIG. 8 is a diagram illustrating the liquid discharge apparatus 1 in which the printer 10 is lowered from the wheeled platform 20 and installed on the installation surface, according to an embodiment of the present disclosure. The conveyance operation and the lifting and lowering operation of the printer 10 by the wheeled platform 20 of the liquid application apparatus 1 according to the present embodiment is described with reference to FIGS. 7 and 8.

In the liquid application apparatus 1 illustrated in FIG. 7, the printer 10 is lifted by the wheeled platform 20 and conveyed with the fixed stands 14 and the adjustment stand 15 separated from the installation surface. The fixed stands 14 and the adjustment stand 15 of the printer 10 are separated from the installation surface. Accordingly, the printer 10 can be conveyed forward, backward, leftward, and rightward by the wheeled platform 20 as desired. As described above, the printer 10 can be moved to a desired printing region.

In the liquid application apparatus 1 illustrated in FIG. 8, the printer 10 is moved downward by the wheeled platform 20, and the fixed stands 14 and the adjustment stand 15 contact the installation surface. By so doing, the printer 10 is supported by the fixed stands 14 and the adjustment stand 15. As described above, the printer 10 that is supported by the fixed stands 14 and the adjustment stand 15 is fixed with respect to the installation surface. Accordingly, the printer 10 can cause the carriage 16 to scan in the main-scanning direction and the sub-scanning direction to perform printing.

Figure 9:
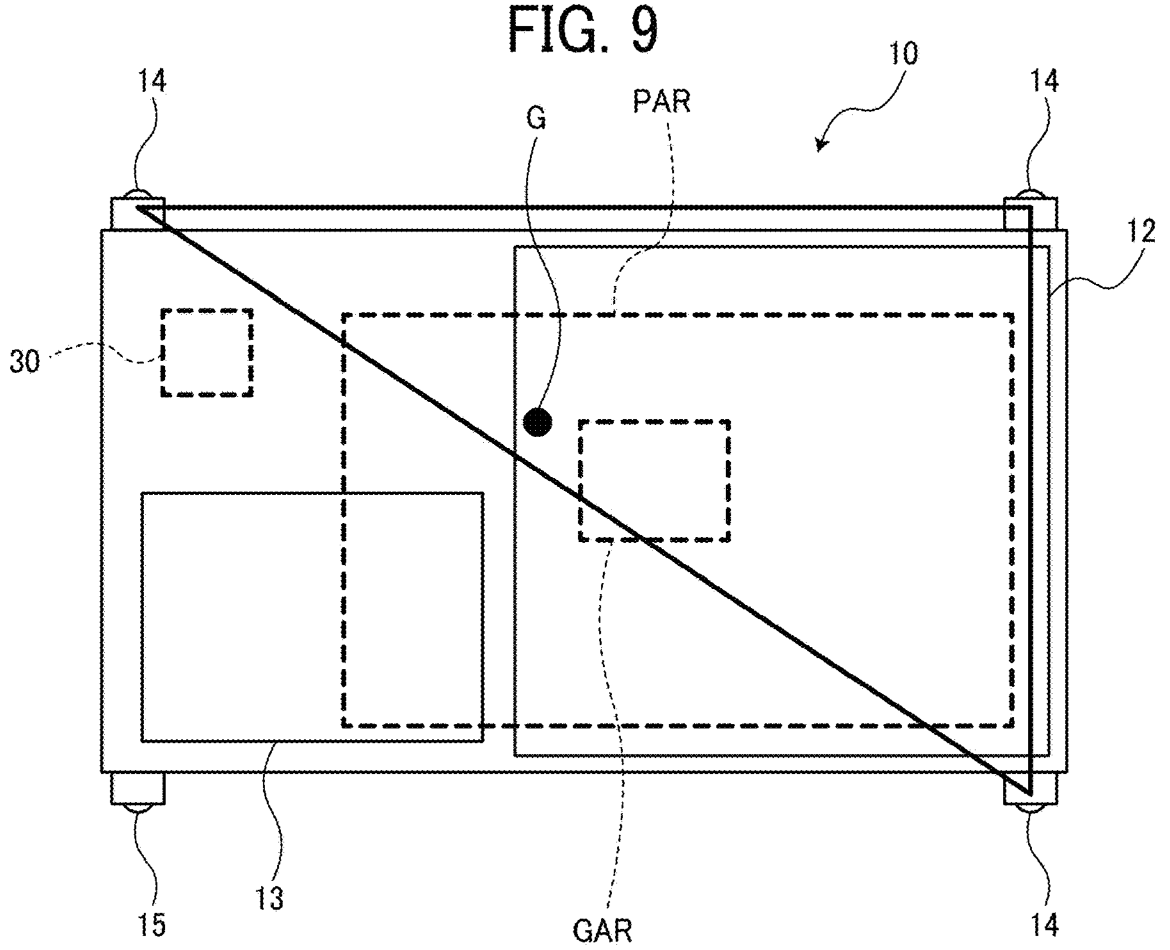
FIG. 9 is a diagram illustrating the relative positions of fixed stands, an adjustment stand, and the center of gravity of the printer in a liquid application apparatus, according to an embodiment of the present disclosure.

Relative Positions of Stands and Center of Gravity of Printer in Liquid Discharge Apparatus FIG. 9 is a diagram illustrating the relative positions of the fixed stands 14, the adjustment stand 15, and the center of gravity of the printer 10 in the liquid application apparatus 1, according to an embodiment of the present disclosure. The relative positions of the three fixed stands 14, the one adjustment stand 15, and the center of gravity of the printer 10 of the liquid discharge apparatus 1 according to the present embodiment are described with reference to FIG. 9.

In FIG. 9, the printer 10 is viewed from above. In an example illustrated in FIG. 9, in the printer 10, the three fixed stands 14 are arranged at positions corresponding to the upper left, the upper right, and the lower right of the sheet surface of FIG. 9, and the adjustment stand 15 is arranged at a position corresponding to the lower left of the sheet surface of FIG. 9.

As described above, when the printer 10 is lowered by the wheeled platform 20, the position of the carriage 16 is moved to a predetermined position, for example, the maintaining position 30, such that the position of the center of gravity of the printer 10 is fixed. In FIG. 9, the position of the center of gravity G is illustrated when the carriage 16 is moved to the predetermined position. The center of gravity G is included in a triangular region illustrated in FIG. 9 defined by the positions of the three fixed stands 14. The printer 10 is lowered by the wheeled platform 20 under the above conditions. By so doing, the printer 10 can be installed on the installation surface in a state in which a stable load is applied to the three fixed stands 14 with respect to the installation surface. The three fixed stands 14 contact the installation surface. Accordingly, the distance between the discharge head of the carriage 16 and the installation surface is defined.

The printer 10 is lowered by the wheeled platform 20 with the stopper 155 released. By so doing, the adjustment stand 15 contacts the installation surface with the adjustment stand 15 biased by the predetermined biasing force with respect to the installation surface. Such a configuration as described above allows the three fixed stands 14 and the adjustment stand 15 to contact the installation surface while the biasing force of the biasing spring 153 of the adjustment stand 15 is applied to the base 152 with respect to the installation surface. The three fixed stands 14 and the adjustment stand 15 contact the installation surface as described above. Accordingly, the printer 10 can be supported by the three fixed stands 14 and the adjustment stand 15. At this time, the position of the shaft 151 in the axial direction, i.e., the vertical direction, is fixed by the stopper 155. Accordingly, when the carriage 16 is moved in a printing region PAR illustrated in FIG. 9 to perform printing, the load applied to the fixed stands 14 and the adjustment stand 15 can be prevented from being released due to the change of the position of the center of gravity G in a gravity-center movement range GAR of the printer 10 and deformation of the frame 11*a* due to the movement of the carriage 16. In addition, printing can be performed with the printer 10 stably fixed on the installation surface. Accordingly, desirable printing quality can be achieved. Further, the position of the printer 10 can be quickly fixed with respect to the installation surface while keeping the distance between the installation surface and the discharge head within a specified range.

Figure 10:
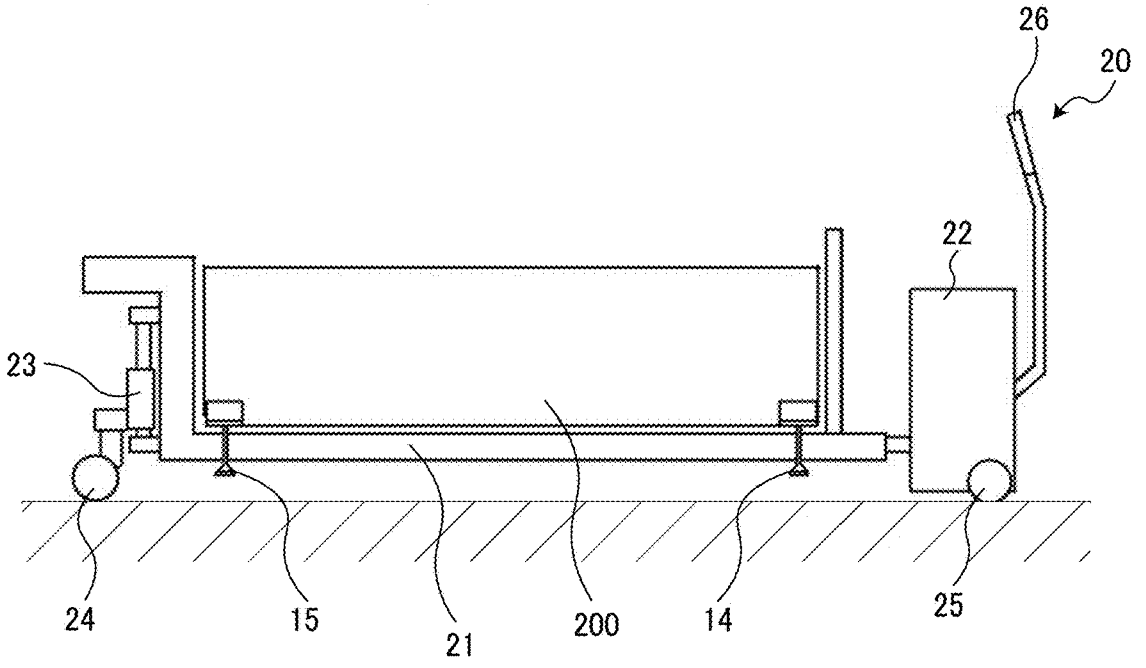
FIG. 10 is a diagram illustrating a configuration of a wheeled platform according to a modification of an embodiment of the present disclosure.

FIG. 10 is a diagram illustrating a configuration of a wheeled platform 200 according to a modification of the above embodiments of the present disclosure.

In the present modification, the wheeled platform 20 that serves as the conveyor, includes a mounting table 200 on the platform frame 21.

In the present embodiment described with reference to FIG. 1, the printer 10 includes the three fixed stands 14 and the one adjustment stand 15. However, in the present modification, the mounting table 200 includes the three fixed stands 14 and the one adjustment stand 15. The mounting table 200 can mount the printer 10 illustrated in FIG. 1 or an object to be conveyed differently from the printer 10. For example, a pallet that can be conveyed by a forklift may serves as the mounting table 200. When a pallet is delivered from the wheeled platform 20 to a forklift, the horizontality of the wheeled platform 20 can be adjusted such that the pallet can be delivered without deviation.

The wheeled platform 20 is not limited to a conveyor manually moved with the handle 26 and may include an automatic traveling mechanism such as an automatic guided vehicle (AGV). The lifting device 22 and the lifting devices 23 support portions of the wheeled platform 20 behind the handle 26 to lift and lower the platform frame 21. When the platform frame 21 is lowered, the fixed stands 14 contact a ground surface. Subsequently, the height and the horizontality of the platform frame 21, in other words, the wheeled platform 20 with respect to the ground surface can be adjusted by the biasing spring 153 of the adjustment stand 15 illustrated in FIG. 4 or the shaft 151 illustrated in FIG. 5.

The platform frame 21 is lifted or lowered by the lifting device 22 and the lifting devices 23. When the platform frame 21 is lifted or lowered, and the mounting table 200 or a pallet mounted on the platform frame 21 is lifted or lowered. At this time, when the platform frame 21 is lowered, first, the fixed stands 14 support the platform frame 21 at three positions. Subsequently, the adjustment stand 15 adjusts such that the platform frame 21 is parallel relative to a forklift based on the relative positions of the ground surface and the forklift.

Other mechanisms of the wheeled platform 21 are similar to the configurations of the wheeled platform 21 illustrated in FIGS. 1, 2, 3, 4, 5, 6, and 7 except that the printer 10 is not mounted on the wheeled platform 21.

Aspects of the present disclosure are as follows.

First Aspect

A liquid discharge apparatus includes a wheeled platform and a discharger. The discharger is disposed on the wheeled platform to discharge a liquid onto an installation surface on which the discharger is installed. The wheeled platform movably holds the discharger in a vertical direction. The discharger includes at least three or more first supports and a second support. The at least three or more first supports are disposed at different corners of the discharger in a plan direction perpendicular to the vertical position, to contact the installation surface to support the discharger. The second support is disposed at a corner different from the corners of the at least three or more first supports in the plan direction, to support the discharger. A position of the second support is adjustable in the vertical direction with respect to the installation surface.

Second Aspect

In the liquid discharge apparatus according to the first aspect, the second support includes a shaft, a base, a plate, a hole, and a fixing member. The base is attached to one end of the shaft to contact the installation surface. The elastic body biases the base against the installation surface. The position determiner includes a plate, a hole, and a fixing member. The plate is fixed to a frame of the discharger and pressed by the elastic body. The hole is disposed in the plate, through which the shaft is inserted. The fixing member fixes a position of the shaft in the vertical direction.

Third Aspect

In the liquid discharge apparatus according to the first aspect, the second support includes a shaft, a base, a lifting mechanism, a detector, and circuitry. The base is attached to one end of the shaft to contact the installation surface. The lifting mechanism moves the shaft in the vertical direction. The detector detects a biasing force applied to the base against the installation surface. The circuitry controls the lifting mechanism to move the shaft in the vertical direction according to the biasing force detected by the detector.

Fourth Aspect

In the liquid discharge apparatus according to any one of the first to the third aspect, the discharger includes a head and a carriage. The head discharges the liquid. The carriage mounts the head to move the head in the plan direction. The carriage is moved to a predetermined position in the plan direction in response to a movement of the discharger at a printing position in the vertical direction.

Fifth Aspect

The liquid discharge apparatus according to the fourth aspect, further includes a maintenance system at the predetermined position to maintain the discharger.

Sixth Aspect

In the liquid discharge apparatus according to any one of the first to the fifth aspect, the at least three or more first supports form a triangular region in the plan direction in the discharger. A center of gravity of the discharger is inside the triangular region in the plan direction in response to a movement of the discharger at a printing position in the vertical direction.

Seventh Aspect

A wheeled platform includes a mounting table movable in a vertical direction. The mounting table includes at least three or more first supports and a second support. The at least three or more first supports are disposed at different corners of the discharger in a plan direction perpendicular to the vertical position, to contact the installation surface to support the discharger. The second support is disposed at a corner different from the corners of said at least three or more first supports in the plan direction, to support the discharger.

Eighth Aspect

In the liquid discharge apparatus according to the first aspect, the at least three or more first supports are movable in the vertical direction.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A liquid discharge apparatus comprising:
- a wheeled platform; and
- a discharger on the wheeled platform, the discharger to discharge a liquid onto an installation surface on which the discharger is installed,
- wherein the wheeled platform movably holds the discharger in a vertical direction, and
- the discharger includes:
  - a frame that has a rectangular shape with four corners;
  - the frame includes only three first supports at three corners of the discharger in a plan direction perpendicular to the vertical direction, to contact the installation surface to support the discharger; and
  - the frame includes only one second support at one corner different from the three corners of the three first supports in the plan direction, to support the discharger, and
  - a position of the second support is adjustable in the vertical direction with respect to the installation surface.

2. The liquid discharge apparatus according to claim 1, wherein the second support includes:
- a shaft;
- a base attached to one end of the shaft to contact the installation surface;
- an elastic body to bias the base against the installation surface;
- a position determiner including:
  - a plate fixed to a frame of the discharger and pressed by the elastic body;
    - a hole in the plate, through which the shaft is inserted; and
  - a fixing structure to fix a position of the shaft in the vertical direction.

3. The liquid discharge apparatus according to claim 1, wherein the second support includes:
- a shaft;
- a base attached to one end the shaft to contact the installation surface;
- a lifting structure to move the shaft in the vertical direction;
- a detector to detect a biasing force applied to the base against the installation surface; and
- circuitry configured to control the lifting structure to move the shaft in the vertical direction according to the biasing force detected by the detector.

4. The liquid discharge apparatus according to claim 1, wherein the discharger includes:
- a head to discharge the liquid; and
- a carriage mounting the head to move the head in the plan direction, and
- wherein the carriage is moved to a predetermined position in the plan direction in response to a movement of the discharger at a printing position in the vertical direction.

5. The liquid discharge apparatus according to claim 4, further comprising a maintenance system at the predetermined position to maintain the discharger.

6. The liquid discharge apparatus according to claim 1, wherein said three first supports form a triangular region in the plan direction in the discharger, and
wherein a center of gravity of the discharger is inside the triangular region in the plan direction in response to a movement of the discharger at a printing position in the vertical direction.

7. The liquid discharge apparatus according to claim 1, wherein said three first supports are movable in the vertical direction.

8. The liquid discharge apparatus according to claim 1, wherein the second support includes:
- a shaft;
- a base attached to one end of the shaft to contact the installation surface; and
- an elastic body to bias the base against the installation surface.

9. The liquid discharge apparatus according to claim 1, wherein the second support includes:
- a shaft;
- a base attached to one end the shaft to contact the installation surface;

a lifting structure to move the shaft in the vertical direction; and a detector to detect a biasing force applied to the base against the installation surface.

10. The liquid discharge apparatus according to claim 1, wherein the discharger includes a head to discharge the liquid.

11. The liquid discharge apparatus according to claim 1, wherein the discharger includes:

a head to discharge the liquid; and a carriage mounting the head to move the head in the plan direction.

12. The liquid discharge apparatus according to claim 1, wherein said three first supports form a triangular region in the plan direction in the discharger.

13. A wheeled platform comprising:

a mounting table movable in a vertical direction, the mounting table including:

a frame that has a rectangular shape with four corners:

the frame includes only three first supports at three corners of a discharger in a plan direction perpendicular to the vertical direction, to contact an installation surface on which the discharger is installed, to support the discharger; and the frame includes only one second support at one corner different from the three corners of the three first supports in the plan direction, to support the discharger.

* * * * *